(12) United States Patent
Gouy

(10) Patent No.: US 9,198,397 B2
(45) Date of Patent: Dec. 1, 2015

(54) COMBINED DOMESTIC TOILETS FOR DOGS

(75) Inventor: Gérard Gouy, Emerainville (FR)

(73) Assignee: SANIDOME CANIN SARL, Emerainville (FR)

(*) Notice: Subject to any disclaimer, the term of this patent is extended or adjusted under 35 U.S.C. 154(b) by 0 days.

(21) Appl. No.: 13/819,955

(22) PCT Filed: Jun. 29, 2011

(86) PCT No.: PCT/FR2011/000387
§ 371 (c)(1),
(2), (4) Date: Feb. 28, 2013

(87) PCT Pub. No.: WO2012/028790
PCT Pub. Date: Mar. 8, 2012

(65) Prior Publication Data
US 2013/0160715 A1    Jun. 27, 2013

(30) Foreign Application Priority Data
Sep. 1, 2010 (FR) ...................... 10 03502

(51) Int. Cl.
*A01K 1/01* (2006.01)

(52) U.S. Cl.
CPC ............... *A01K 1/0125* (2013.01); *A01K 1/011* (2013.01); *A01K 1/0107* (2013.01)

(58) Field of Classification Search
CPC ... A01K 1/0107; A01K 1/011; A01K 1/0114; A01K 1/01; A01K 1/0125; A01K 23/005
USPC ......... 119/161, 165, 166, 167, 168, 169, 170, 119/479
See application file for complete search history.

(56) References Cited

U.S. PATENT DOCUMENTS

| | | | | |
|---|---|---|---|---|
| 2,671,427 A | * | 3/1954 | Fell | 119/166 |
| 3,233,588 A | * | 2/1966 | Thomas | 119/166 |
| 4,979,469 A | * | 12/1990 | Clark | 119/161 |
| 4,986,218 A | * | 1/1991 | Cassone | 119/169 |
| 5,134,974 A | * | 8/1992 | Houser | 119/168 |

(Continued)

FOREIGN PATENT DOCUMENTS

| | | |
|---|---|---|
| EP | 1 488 691 A2 | 12/2004 |
| FR | 2 599 585 A1 | 12/1987 |

(Continued)

OTHER PUBLICATIONS

International Search Report for PCT/FR2011/000387, mailing date of Nov. 10, 2011.

*Primary Examiner* — Trinh Nguyen
(74) *Attorney, Agent, or Firm* — Westerman, Hattori, Daniels & Adrian, LLP

(57) ABSTRACT

A canine toilet for domestic use has a collector for collecting urine and a deflector arranged essentially vertically to collect male dogs' urine. The collector
  comprises a tray intended to be placed on the
  ground, a cover closing the collector, and comprising at least one
  hopper, at least one extractable drawer inserted into one of the sides of the
  tray. The deflector is arranged on the collector to permit the flow of male dog urine into the hopper, which is arranged to route the urine into the drawer.

12 Claims, 2 Drawing Sheets

(56) References Cited

U.S. PATENT DOCUMENTS

| | | | |
|---|---|---|---|
| D381,136 S * | 7/1997 | Savicki | D30/161 |
| 6,079,363 A * | 6/2000 | MacLaine | 119/161 |
| 7,434,539 B2 * | 10/2008 | Gloor | 119/165 |
| 2004/0261727 A1 | 12/2004 | Matsuo et al. | |
| 2006/0037548 A1 | 2/2006 | Mohr | |
| 2007/0163508 A1 | 7/2007 | Gloor | |
| 2008/0251026 A1 * | 10/2008 | Bell et al. | 119/168 |

FOREIGN PATENT DOCUMENTS

| | | |
|---|---|---|
| FR | 2 842 700 A1 | 1/2004 |
| WO | 2010/024845 A1 | 3/2010 |

* cited by examiner

COMBINED DOMESTIC TOILETS FOR DOGS

The invention relates to a canine toilet for domestic use.

Using this device dogs can urinate or defecate in their own living space and avoid the unpleasantness and nuisance caused by animal excretion in urban spaces, on pavements and other public places. It is aimed at all dog owners and particularly those who live in urban areas. It avoids the need for dogs to refrain from excretion during long periods of time when their masters are absent.

U.S. Pat. No. 4,986,218 describes a canine toilet comprising a collector containing an absorbent pad laid on a plastic sheet. The toilet also has a vertical deflector that directs the urine of the male (which urinates "standing up") into the collector.

Nevertheless, this device has significant drawbacks. In particular, this device is not suitable for a male dog which is only able to station itself partially over the toilet.

Two positions are necessary for the male, dependent on whether it is urinating or defecating. Moreover, urine and faeces are collected by an absorbent pad placed at the bottom of the collector. The dog, if left alone during the day, will refuse to use the device several times to avoid putting its feet in its own urine. Likewise, the use of disposable absorbent pads results in disposal problems for the owner who will have to replace the pads each time the dog goes to the toilet. The volume of absorbent pads, collected across a whole town will overload the amount of household waste. Accessories necessary for its functioning (pads and plastic sheets) are not environmentally friendly.

The invention solves at least some of the above disadvantages.

The invention therefore relates to a canine toilet for domestic use having a collector for collecting urine and a deflector arranged essentially vertically to collect male dogs' urine characterized in that the collector comprises:

a tray intended to be placed on the ground;

a cover closing the collector and comprising at least one hopper;

at least one extractable drawer inserted into one of the sides of the tray;

the deflector being arranged on the collector to permit the flow of male dog urine into the hopper, which is arranged to direct the urine into the drawer.

Thus, the urine of the male like that of the female is collected in extractable, easy to clean drawers. Maintenance of the toilet is thus facilitated. Moreover the dog always has a clean toilet because the urine is immediately directed into the drawer. The cover on which it stands is therefore always clean.

Advantageously, the cover has at least one grating that supports the animal. A grating makes it possible to have a stable and clean surface for the animal as it passes over the device and has a gripper system for maintaining the wipe in position. In addition, the cover may comprise fastening means for a wipe that will receive the solid excretion;

As the toilet is designed to be used in the home, it can be closed and has a handle and feet so that it can easily be stored vertically.

An exemplary embodiment of the invention is described below with reference to the accompanying drawings which are given as a non-limiting example:

Figure 1:
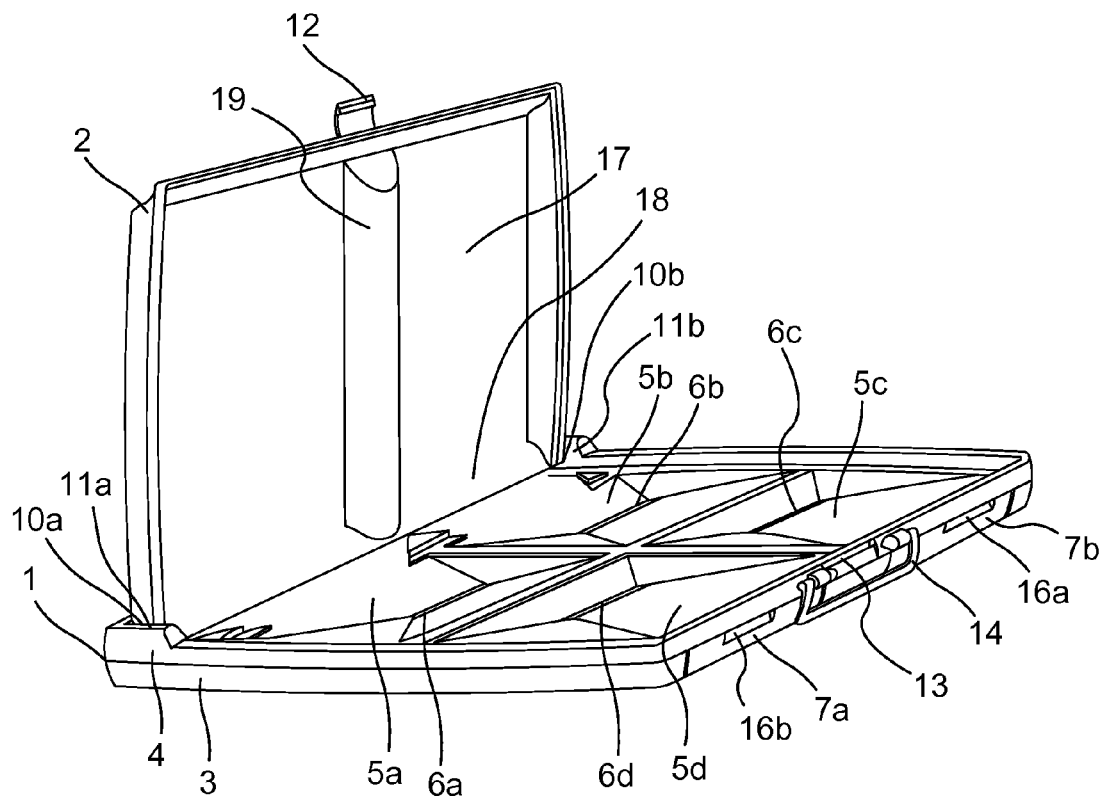
FIG. 1 shows a canine toilet according to the invention.

With reference to FIG. 1, the toilet comprises a collector 1 in the form of a tray placed on the ground which collects the urine. The collector 1 comprises a bottom side placed on the ground, vertical side faces 3 and a cover 4 closing the tray 3. Two drawers 7a and 7b are inserted by the front side face in the collector 1 between the bottom side and the cover 4. The cover 4 which may be integral with the tray 3 or hollowed by four hoppers 5a, 5b, 5c, 5d, each terminated by an opening in the form of a slot 6a, 6b, 6c, 6d. The hoppers are arranged to direct the urine into the drawers 7a, 7b. The hoppers are in the form of funnels whose walls are plane and which direct the urine into a slot, of essentially rectangular shape that opens out into the drawers.

The drawers 7a, 7b are arranged to come flush with the front panel of the collector 1 so as not to create any projections. Each drawer 7a, 7b has an integral withdrawal handle 16a, 16b for its extraction.

The toilet likewise has a deflector 2 arranged essentially vertically along the rear panel of the collector 1 that is intended to catch a male dog's urine. The deflector 2 is a tray formed of a vertical plate 17 and four walls perpendicular to the plate. The deflector 2 comprises at its base, that is to say in the vicinity of its junction with the collector 1, a ledge 18 which directs the urine flowing along the plate 17 towards the cover 4 and the hoppers 5a, 5b, 5c, 5d.

Figure 2:
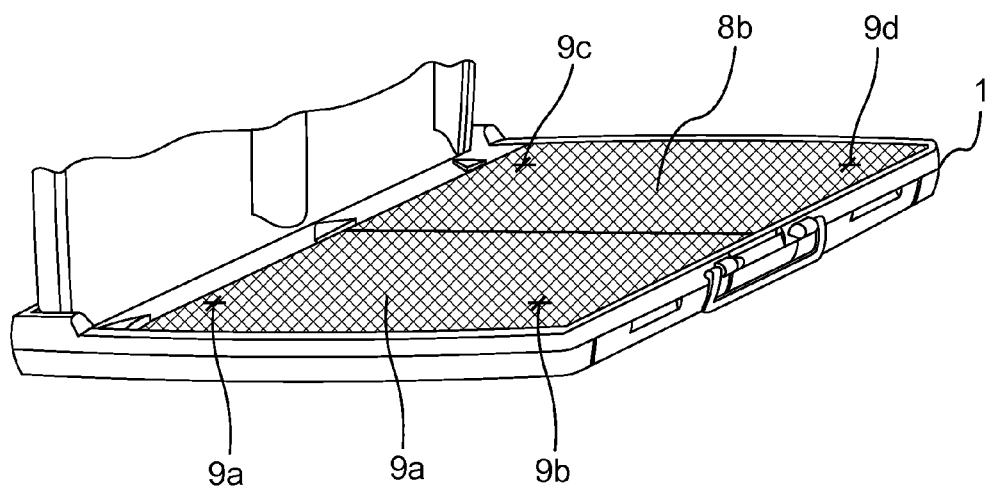
FIG. 2 is a detailed view of the toilet shown in FIG. 1.

FIG. 2 shows the collector 1 on which two gratings 8a and 8b are positioned that allow the animal to stand on the collector 1 without being disturbed by the hoppers. The gratings 8a, 8b can be removed for easy cleaning or be integrated into the cover to facilitate manufacture of the cover and reduce costs. The gratings 8a, 8b ensure the dogs paws are isolated from its own urine. The dog always has a clean, dry, space no matter how many times the device is used.

Thus, a male dog wishing to urinate stands on the cover and urinates on the deflector 2. Urine flows along the plate 17 then is directed towards the collector 1 via the ledge 18. The urine is then directed towards the drawers 7a, 7b by the hoppers 5a, 5b, 5c, 5d.

A female stands directly on the collector 1 to urinate. Its urine is then directed directly towards the drawers 7a, 7b by the hoppers 5a, 5b, 5c, 5d.

The toilet is simple and practical. It remains clean even after being used several times. The removable drawers 7a, 7b are easy to clean and environmentally friendly because they do not require absorbent pads.

In the case of solid excretion (faeces), the cover 4 includes holding means for wipes. The grating 8a, 8b, shown in FIG. 2 includes clips 9a, 9b, 9c and 9d designed to hold wipes on the gratings. Dogs normally defecate at a fixed time. It is therefore easy for the owner to place a wipe on the collector 1 at the time the dog normally defecates. Thus, apart from specific times, the toilet remains useable for urinating without the dog being troubled by the presence of a fouled wipe.

The dimensions of the collector 1 are matched to dogs of small and medium size (the greatest population in urban areas) so that when necessary they can stand entirely and comfortably over the collector. It is important that the male can stand completely on the collector 1 so that it is comfortable. This is the reason why the collector 1 and deflector 2, which are of the same size, are wider rather than deep. The collector 1 is arranged so that a medium sized dog can stand so that it is parallel to the deflector 2, so that upon lifting its leg to urinate, the urine is directed toward the deflector 2.

Figure 3:
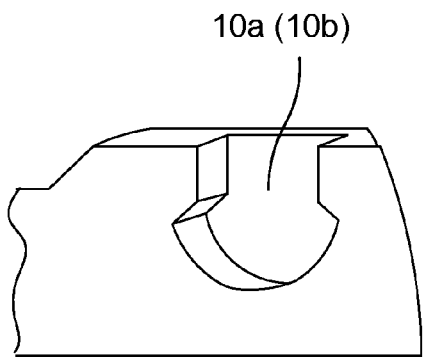
FIGS. 3 and 4 illustrate the attachment means of the deflector on the collector.
Figure 4:
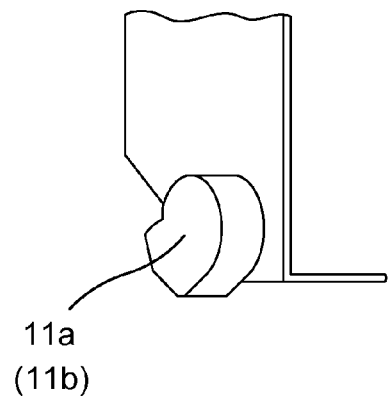

Preferably the deflector 2 pivots relative to and is detachable from the collector 1. The deflector 2 opens in a vertical position and closes over the collector 1 to create a tight seal to facilitate transport of the toilet. It further comprises at its middle and across its entire height, a projecting shape 19 that is used to hold in place the two gratings 8a, 8b when the device is closed. The deflector 2 pivots about the interior of the collector 1 thanks to pivots 10a, 10b and recesses 11a, 11b, shown in FIGS. 3 and 4, which allow it to open beyond 90°. Thus, the deflector is supported on the rear side wall of the collector 1 with the centre of gravity towards the outside to allow the deflector 2 to be positioned substantially vertically and not be closed in on itself.

Figure 6:
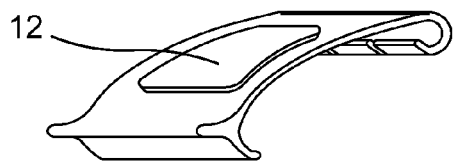
FIG. 6 illustrates a closure mechanism.

The toilet includes a closure mechanism 12 and 13 for securing the collector 1 and the deflector 2 in the closed position. The closure mechanism 12 and 13 comprises a curved flap 12 shown in FIG. 6, mounted so that it pivots on the deflector 2. The collector 1 has a notch 13 which receives the matching flap 12. The flap 12 uses the flexibility and bowing of the plastic and its "shape memory" capability to ensure tight fitting.

Figure 5:
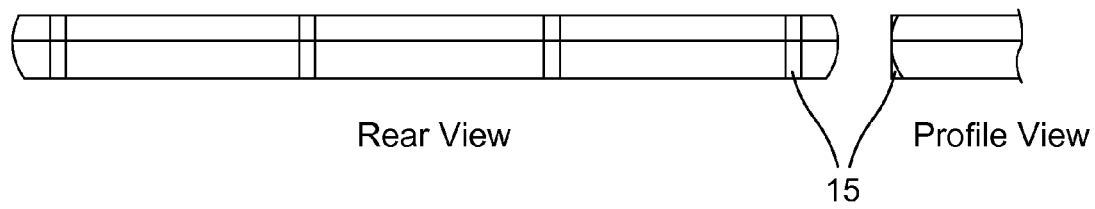
FIG. 5 illustrates a toilet base.

With reference to FIG. 5, the toilet may have a base 15 so that the toilet remains upright once it is closed. The toilet may likewise have a handle 14 on the front side surface of the collector 1 to allow transport of the toilet in the closed position.

The toilet described includes provisions according to a particular realisation mode. Other provisions may be used. In particular, the toilet is preferably made of plastic. However, other materials such as cardboard, polystyrene, wood, composite materials, metal, can be considered.

The deflector 2 is hinged on the collector 1 by a detachable pivot. The deflector 2 can be detachable or just hinge. It is possible to implement the pivot using removable shafts inserted in openings arranged in opposing fashion on the collector 1 and the deflector 2.

The number of hoppers, drawers and gratings may vary and is not limited to the example shown. In particular, the grating may be made of a single piece. Similarly, a single hopper is sufficient if it is arranged to collect all the urine and direct it towards the drawers.

The hoppers are an integral part of the collector cover, but may be supported on the collector.

The walls of the hoppers need not necessarily be flat.

Similarly, the positioning of accessories (handle, base, closure system) can be changed, according to requirements, to favour one of the other sides.

These accessories are made of plastic, but can be made of other materials such as metal, rubber, fabric.

The invention claimed is:

1. Canine toilet for domestic use having a collector for collecting urine and at least one deflector which can be arranged essentially vertically to collect male dogs' urine,
   wherein the collector comprises:
   a first tray intended to be placed on the ground;
   a cover closing the collector and comprising at least one hopper;
   at least one extractable drawer inserted into one of the sides of the first tray,
   wherein the deflector is arranged on the collector to permit the flow of male dog urine into the hopper, which is arranged to direct the urine into the drawer, through an opening,
   wherein the deflector is mounted so that the deflector pivots on the collector and the deflector is arranged so that, in a closed position of the deflector, the deflector covers the collector and closes the collector tightly, and in an open position of the deflector, the deflector is positioned in an essentially vertical position with respect to an essentially horizontal position of the first tray,
   wherein the deflector forms a second tray comprising a plate and lateral, top and bottom side walls forming a peripheral edge of the deflector, the deflector comprising in the vicinity of the collector a ledge,
   wherein, in the open position of the deflector, the ledge is positioned at a bottom end of the deflector between the lateral side walls of the deflector and forms a surface that entirely slants forward and downward with respect to the plate, said surface having a rear edge adjacent the plate and a front edge positioned above the hopper, so that the ledge directs all the urine flowing along the plate towards the hopper.

2. Toilet according to claim 1 wherein the cover comprises at least one grating.

3. Toilet according to claim 2, wherein the grating is removable.

4. Toilet according to claim 3, wherein the cover includes means for holding a wiper on the grating.

5. Toilet according to claim 1, wherein the dimensions of the collector and the deflector are sufficient to receive a medium size dog.

6. Toilet according to claim 1, wherein the deflector and the collector have means for locking the toilet in the closed position.

7. Toilet according to claim 1, having a handle.

8. Toilet according to claim 1, having feet for vertical positioning of the toilet once closed.

9. Toilet according to claim 1, wherein the side walls of the deflector include four side walls perpendicular to the plate.

10. Toilet according to claim 1, wherein the deflector is detachable from the collector.

11. Toilet according to claim 1, wherein the collector and the deflector comprise means for holding the deflector essentially vertical.

12. Toilet according to claim 1, wherein the cover comprises at least one grating, and wherein the deflector further comprises a projecting shape that holds the grating in place in the closed position of the deflector, said projecting shape being located in the middle of the deflector and across an entire height of the deflector in the vertical position of the deflector.

\* \* \* \* \*